United States Patent
Wu et al.

(10) Patent No.: US 12,340,529 B2
(45) Date of Patent: Jun. 24, 2025

(54) MACHINE LEARNING-BASED OBJECT-CENTRIC APPROACH TO IMAGE MANIPULATION

(71) Applicant: Advanced Micro Devices, Inc., Santa Clara, CA (US)

(72) Inventors: Vickie Youmin Wu, Santa Clara, CA (US); Xiaojia Song, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 534 days.

(21) Appl. No.: 17/562,913

(22) Filed: Dec. 27, 2021

(65) Prior Publication Data

US 2022/0270273 A1   Aug. 25, 2022

Related U.S. Application Data

(60) Provisional application No. 63/151,517, filed on Feb. 19, 2021.

(51) Int. Cl.
| | |
|---|---|
| *G06K 9/00* | (2022.01) |
| *G06T 5/70* | (2024.01) |
| *G06T 5/77* | (2024.01) |
| *G06T 7/50* | (2017.01) |

(52) U.S. Cl.
CPC .......... *G06T 7/50* (2017.01); *G06T 5/70* (2024.01); *G06T 5/77* (2024.01); *G06T 2207/10016* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2022/0086360 A1* | 3/2022 | Deng | ..................... | G06N 3/045 |
| 2022/0383530 A1* | 12/2022 | Giryes | ................... | G03B 35/08 |

OTHER PUBLICATIONS

Song, C., et al., "Unsupervised Monocular Depth Estimation Method Based on Uncertainty Analysis and Retinex Algorithm", Sensors 2020, 20(18) 5389, Sep. 21, 2020, 11 pgs.

Simmons-Edler, R. & Feng, B., "Instance Segmentation", downloaded from https://www.cs.princeton.edu/courses/archive/spring18/cos598B/public/outline/Instance%20Segmentation.pdf on Dec. 26, 2021, 51 pgs.

* cited by examiner

*Primary Examiner* — Wei Wen Yang
(74) *Attorney, Agent, or Firm* — Volpe Koenig

(57) ABSTRACT

A technique for processing images is disclosed. The technique includes determining depth information for an image; identifying a depth threshold; and modifying content of the image based on a comparison of the depth information and the depth threshold.

20 Claims, 5 Drawing Sheets

MACHINE LEARNING-BASED OBJECT-CENTRIC APPROACH TO IMAGE MANIPULATION

CROSS REFERENCE TO RELATED APPLICATIONS

This application claims the benefit of U.S. Provisional application No. 63/151,517, entitled "MACHINE LEARNING-BASED OBJECT-CENTRIC APPROACH TO IMAGE EDITING," filed on Feb. 19, 2021, the entirety of which are hereby incorporated herein by reference.

BACKGROUND

Video and image processing a wide variety of techniques for manipulating data. Improvements to such techniques are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for processing images is disclosed. The technique includes determining depth information for an image; identifying a depth threshold; and modifying content of the image based on a comparison of the depth information and the depth threshold.

Figure 1:
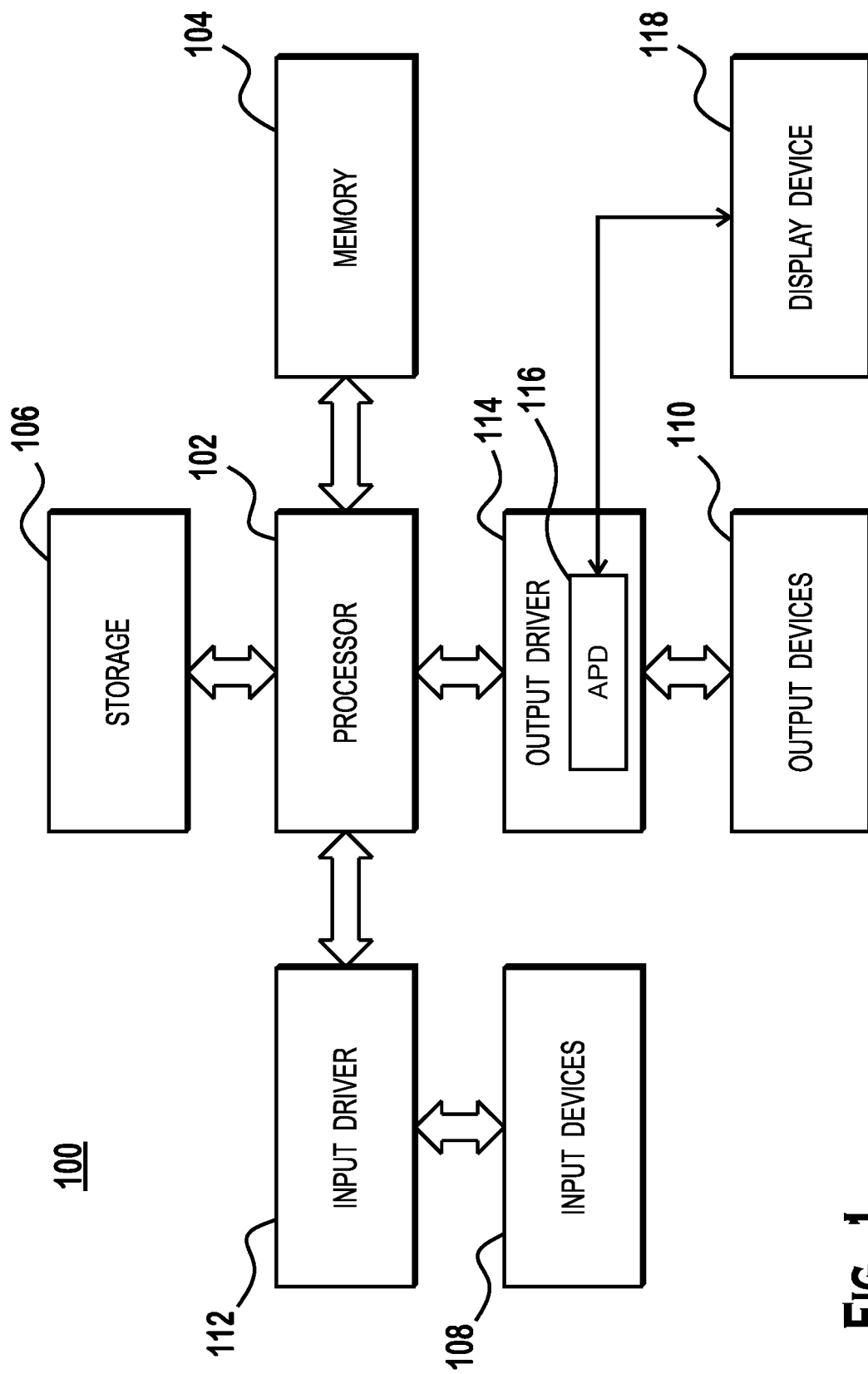
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 In various examples, the computing device 100 is one of, but is not limited to, for example, a computer, a gaming device, a handheld device, a set-top box, a television, a mobile phone, a tablet computer, or other computing device. The device 100 includes one or more processors 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the one or more processors 102 include a central processing unit (CPU), a graphics processing unit (GPU), a CPU and GPU located on the same die, or one or more processor cores, wherein each processor core can be a CPU or a GPU. In various alternatives, the memory 104 is located on the same die as one or more of the one or more processors 102, or is located separately from the one or more processors 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that interface with and drive input devices 108 and output devices 110, respectively. The input driver 112 communicates with the one or more processors 102 and the input devices 108, and permits the one or more processors 102 to receive input from the input devices 108. The output driver 114 communicates with the one or more processors 102 and the output devices 110, and permits the one or more processors 102 to send output to the output devices 110.

In some implementations, the output driver 114 includes an accelerated processing device ("APD") 116. In some implementations, the APD 116 is used for general purpose computing and does not provide output to a display (such as display device 118). In other implementations, the APD 116 provides graphical output to a display 118 and, in some alternatives, also performs general purpose computing. In some examples, the display device 118 is a physical display device or a simulated device that uses a remote display protocol to show output. The APD 116 accepts compute commands and/or graphics rendering commands from the one or more processors 102, processes those compute and/or graphics rendering commands, and, in some examples, provides pixel output to display device 118 for display. The APD 116 includes one or more parallel processing units that perform computations in accordance with a single-instruction-multiple-data ("SIMD") paradigm. In some implementations, the APD 116 includes dedicated graphics processing hardware (for example, implementing a graphics processing pipeline), and in other implementations, the APD 116 does not include dedicated graphics processing hardware.

A scene depicted in a video often includes different elements that are at different distances from a camera. Distinguishing between objects at different distances could provide a number of benefits. For example, it could be possible to discern conceptual subdivisions of a scene, such as background, subject, and foreground. Once distinguished, effects such as selective blurring or replacement could be applied selectively to the different subdivisions. Thus, techniques for discerning the depth of different portions of video frames or images are provided herein. In general, these techniques include processing frames or images through one or more neural networks that are trained and configured as described herein. Aspects of training these neural networks, as well as of utilizing the neural networks in conjunction with other operations, are now described.

Figure 2:
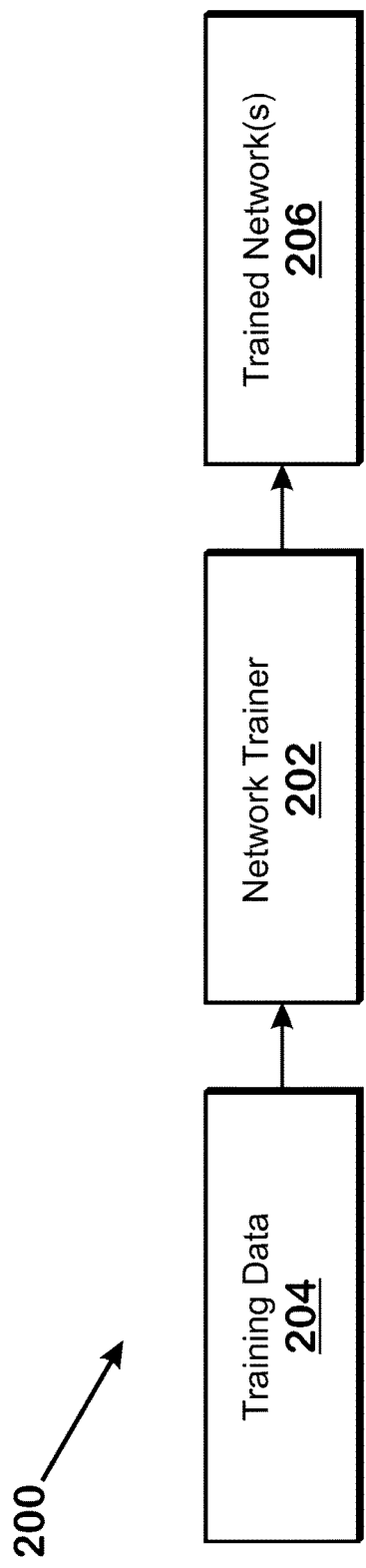
FIG. 2 illustrates a system for training one or more neural networks for analyzing video and modifying images, according to an example.

FIG. 2 illustrates a system 200 for training one or more neural networks for analyzing video or images to generate depth-based data and to modify the image or video based on the dept-based data, according to an example. The system 200 includes a network trainer 202, which accepts training data 204 and generates one or more trained neural networks 206.

In various examples, the system 200 is, or is a part of, an instance of the computing device 100 of FIG. 1. In various examples, the network trainer 202 includes software that executes on a processor (such as the processor 102 or the APD 116). In various examples, the software resides in storage 106 and is loaded into memory 104. In various examples, the network trainer 202 includes hardware (e.g., circuitry) that is hard-wired to perform the operations of the network trainer 202. In various examples, the network trainer 202 includes a combination of hardware and software that perform the operations described herein. The generated trained neural networks 206 and the training data 204 used to train those neural networks 206 are described in further detail below.

Figure 3:
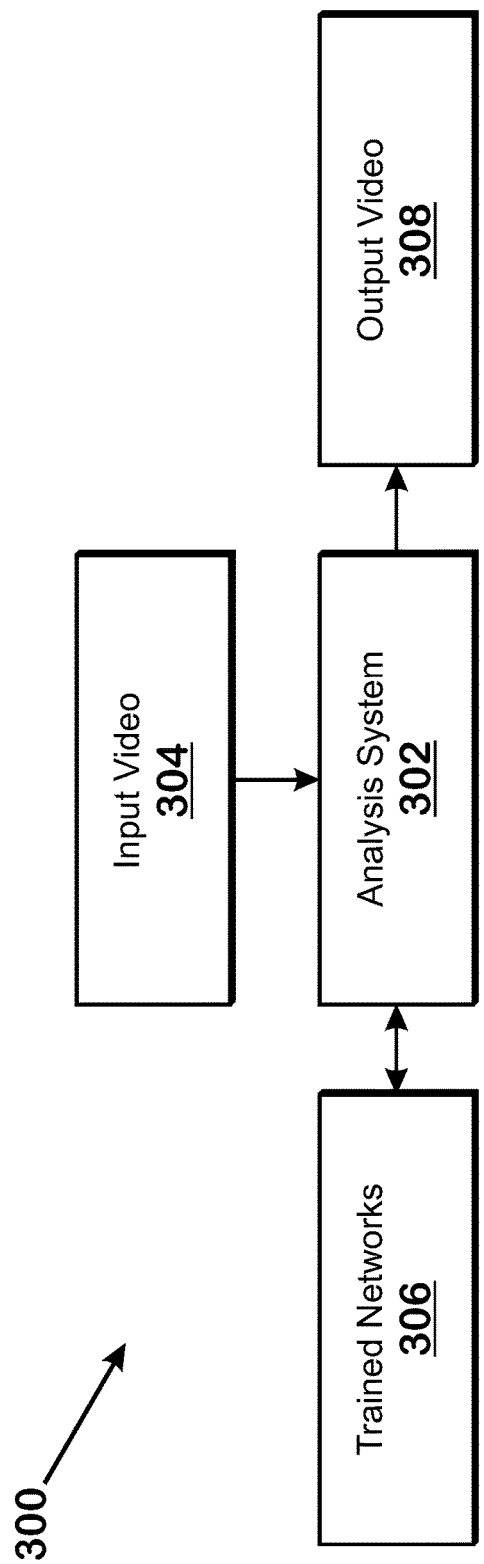
FIG. 3 illustrates a system for analyzing and modifying video, according to an example.

FIG. 3 illustrates a system 300 for analyzing and modifying video based on distance of objects from the camera, according to an example. The system 300 includes an analysis system 302 and trained networks 306. In some implementations, the trained networks 306 are the same as the trained networks 206 of FIG. 2. The analysis system 302 utilizes the trained networks 306 to analyze and modify video 304 to generate output video 308.

In some examples, the system 300 is, or is part of, an instance of the computing device 100 of FIG. 1. In some examples, the computing device 100 that the system 300 is or is a part of is the same computing device 100 as the computing device that the system 200 of FIG. 2 is or is a part of. In various examples, the analysis system 302 includes software that executes on a processor (such as the processor 102 or the APD 116). In various examples, the software resides in storage 106 and is loaded into memory 104. In various examples, the analysis system 302 includes hardware (e.g., circuitry) that is hard-wired to perform the operations of the analysis system 302. In various examples, the analysis system 302 includes a combination of hardware and software that perform the operations described herein. In some examples, one or more of the trained networks 306 of FIG. 3 are the same as one or more of the neural networks 206 of FIG. 2. In other words, the system 200 of FIG. 2 generates trained neural networks that are used by the analysis system 302 to analyze and edit video.

Figure 4:
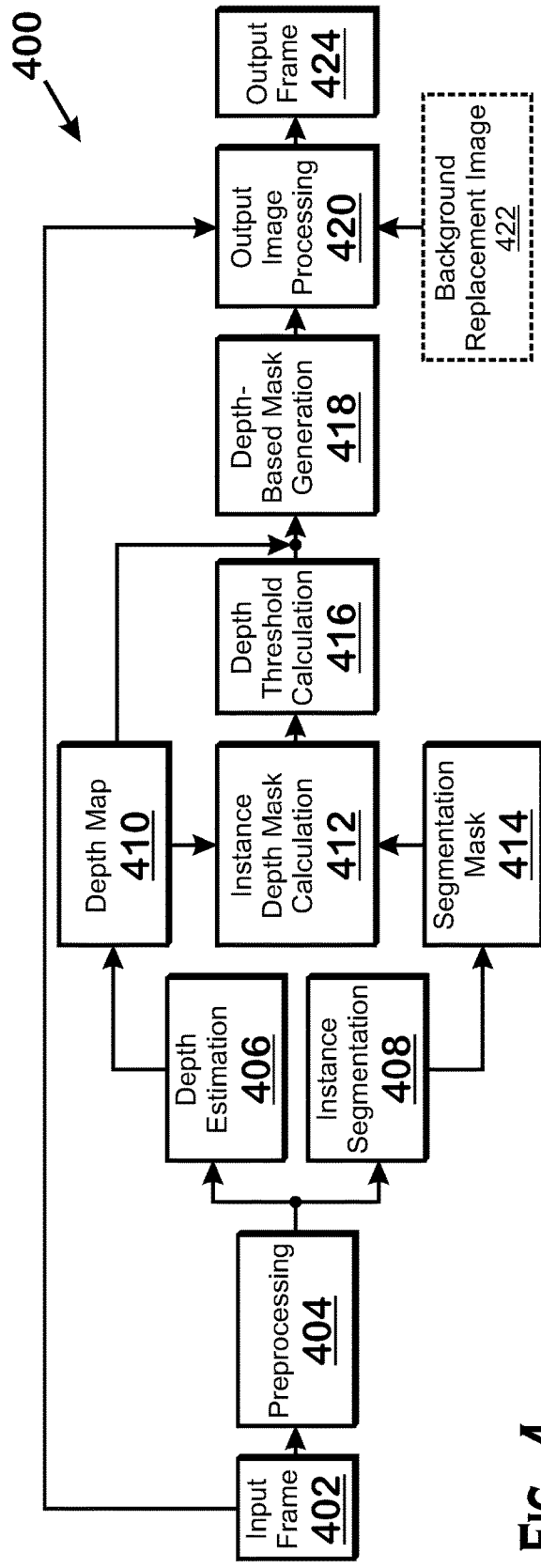
FIG. 4 is a block diagram illustrating a video processing system, according to an example.

FIG. 4 is a block diagram illustrating a video processing system 400, according to an example. The video processing system 400 includes a preprocessing unit 404, a depth estimation unit 406, an instance segmentation unit 408, an instance depth mask calculation unit 408, a depth threshold calculation unit 416, a depth-based mask generation unit 418, and an output image processing unit 420. The video processing system 400 accepts an input frame 402 (e.g., of video) and generates an output frame 424. The input frame 402 may be stored at least initially in a memory. In general, the video processing system 400 selectively blurs a portion of the input frame 402 or replaces a portion of the input frame 402 with the background replacement image 422. Selection of which portion of the input frame 402 to blur or replace occurs based on depth information. Herein, blurring at least a portion of an image or replacing at least a portion of an image with a background, based on depth, is sometimes collectively referred to herein as "modifying an image based on depth" or "a depth-based modification," or a similar phrase.

The video processing system 400 modifies an image based on depth according to one of two modes. In one mode—"the tracking mode," the video processing system 400 identifies a subject within the input frame 402, determines a depth associated with the subject, and modifies (blurs or replaces) portions of the input frame 402 that are significantly closer to the camera or farther from the camera than the subject. In another mode—"the fixed-depth mode," the video processing system 400 determines a threshold depth and modifies (blurs or replaces) the portions of the input frame 402 closer to the camera than or farther from the camera than the threshold depth. In some examples, the threshold depth is obtained as a setting in an application from, for example, a user.

The video processing system 400 is now explained in greater detail. The depth estimation block 406 and the instance segmentation block 408 are implemented as neural networks. In some examples, each of these blocks is implemented as a combination of the analysis system 302 and trained networks 306 of FIG. 3. It should be understood that the trained networks 306 for the depth estimation block 406 is different than the trained networks 306 for the instance segmentation block 408.

The depth estimation block 406 generates the depth map 410. The depth map 410 indicates the depths at different portions of the input frame 402. The term "depth" means distance from the camera. An object that has a greater depth is farther from the camera than an object that has a lower depth. In an example, the depth map 410 indicates the depth of each pixel of the input frame 402. In other examples, the granularity of depth information is different than per pixel. In other words, in such other examples, each item of depth information specifies depth for a group of pixels of the input frame 402.

In some examples, the depth estimation block 406 is or includes a neural network that is trained to identify depths within an image. In some examples, training occurs in the following manner. A trainer is provided with images and information indicating depths (e.g., pixels, objects) of the components of the images. The trainer feeds the neural network with the images, obtains depth maps as outputs, compares the depth maps to the information indicating depths, and updates the neural network to improve the accuracy of the neural network in terms of identifying depths of images.

The instance segmentation unit 408 identifies the outline for one or more objects of the input frame 402 (these objects are sometimes referred to as "objects of interest" herein). In some examples, the objects identified are people. In other examples, or in addition, the objects identified can vary. It is possible for different implementations to identify one or more objects alternatively to or in addition to a person. The instance segmentation block 408 generates a segmentation mask 414. The segmentation mask 414 indicates which portions of the input frame 402 are covered by the identified objects and which portions of the input frame 402 are not covered by the identified objects. In some examples, the segmentation mask 414 includes a set of pixels, each of which corresponds to an area of the input frame 402. Pixels having one value indicate that the corresponding area of the input frame 402 is not covered by an identified object, and pixels having a different value indicate that the corresponding area of the input frame 402 is covered by an identified object. In some examples, as with the depth estimation unit 406, the instance segmentation unit 408 includes a trained neural network that is trained to recognize specific objects and to segmentation instance masks 414. In an example, a trainer accepts samples including images and identifications of objects in the form of segmentation masks 414. The trainer trains the neural network for the instance segmentation block 408 by applying the sample images to the neural network, comparing the output of the neural network to the identifications of objects, and modifying the neural network to improve the ability of the neural network to generate segmentation masks 414, based on the comparison.

The instance depth mask calculation unit 412 operates differently dependent on whether the video processing system 400 is operating in the tracking mode or in the fixed depth mode. In the fixed depth mode, the instance segmentation 408 unit does not operate. The instance depth mask calculation unit 412 passes the depth map 410 through to the depth threshold calculation unit 416. In the tracking mode, the instance segmentation unit 408 does generate the segmentation mask 414. The instance depth mask calculation 412 generates an instance depth mask. The instance depth mask includes depth data for the portions of the input frame 402 identified as objects of interest by the instance segmentation unit 408, and includes information indicating that all other portions of the input frame 402 are considered irrelevant for depth threshold calculation purposes. Put differently, the instance depth mask calculation unit 412 masks out the portions of the input frame 402 not identified as objects of interest by the instance segmentation unit 408.

The depth threshold calculation unit 416 calculates the depth threshold which determines which portions of the input frame 402 are modified (e.g., blurred or replaced with a background image 422). The depth threshold calculation unit 416 calculates this depth threshold differently based on whether the video processing system 400 is operating in the fixed depth mode or the tracking mode. In the fixed depth mode, the depth threshold calculation 416 uses a fixed depth as the depth threshold. In some examples, the fixed depth is a depth provided by an application or pre-programmed into the depth threshold calculation unit 416. In some examples, the application is a video conferencing application or other type of application that records or obtains video from a camera. In some such examples, the application provides an interface to a user to select a depth threshold. In response to the user entering such depth threshold, the application provides that depth threshold to the video processing system 400 to be used as the depth threshold for the depth threshold calculation unit 416.

In the tracking mode, the depth threshold calculation unit 416 calculates the depth threshold based on the instance depth mask generated by the instance depth mask calculation unit 412. Conceptually, the depth threshold calculation unit 416 determines a depth that is characteristic of the object of interest. In an example, the depth threshold is an average depth of the object of interest, a closest depth of the object of interest, a farthest depth of the object of difference, or any other value that is characteristic of the object of interest.

The depth-based mask generation unit 418 generates a depth-based mask, based on the depth map 410 and the depth threshold. The depth-based mask includes different values for different portions of the input image. One value indicates that the portion should be modified (e.g., blurred or replaced with a background replacement image 422). A different value indicates that the portion should not be modified. In some examples, the depth-based mask generation unit 418 generates the mask by, for the portions of the depth map 410 that pass the threshold, setting a value indicating that the portion should be modified, and for the portions that do not pass the threshold, setting a value indicating that the portion should not be modified. In some examples, "passing" the threshold means that a depth value is greater than the threshold. In other examples, passing means that the depth value is lower than the threshold. In other examples, any technically feasible comparison function can be used to determine whether a depth value of the depth map 410 passes the threshold to generate the depth-based mask.

The output image processing unit 420 accepts the input frame 402, the depth-based mask, and the background replacement image 422 if used, and modifies the input frame 402 based on the depth-based mask and the background replacement image 422, if used. More specifically, the output image processing unit 420 replaces the portions of the input frame 402 indicated as passing the threshold with a blurred or replaced version of the corresponding portion of the input frame 402, and does not blur or replace portion of the input frame 402 indicated as not passing the threshold. The result is the output frame 424, which is a modified version of the input frame 402, with portions of the image that "pass" the threshold being blurred or replaced with the background replacement image 422, and with the other portions unmodified. Put differently, the result of processing through the video processing system 400 is an image with portions blurred or replaced, where the portions selected are based on depth within the image. In the tracking mode, a threshold depth based on an object of interest is used to divide the image into portions that should be modified and portions that should not be modified. For example, in one mode, all portions of the image that are farther than the camera from the object of interest are blurred. As the subject moves through the scene (meaning successive frames are processed), the portions of the scene that are blurred change based on the distance of the subject from the camera. In the fixed-depth mode, the depth that acts as the threshold is not dependent on the content of the image. Thus even where an object of interest moves through the scene, the stationary objects in the scene that are modified does not change. In other words, stationary objects do not go from blurred or replaced to not blurred or replaced, or from not blurred or replaced to blurred or replaced, despite movement of the objects of interest. However, whether objects of interest themselves are blurred or replaced can change if the objects of interest cross the depth threshold. For example, it is possible for a person that is not blurred or replaced while close to the camera to become blurred or replaced after moving farther away from the camera. It is also possible for a blurred or replaced person to become not blurred or replaced in response to the person coming closer to the camera.

Each of the units (e.g., the preprocessing unit 404, the depth estimation unit 406, the instance segmentation unit 408, the instance depth mask calculation unit 412, the depth threshold calculation unit 416, the depth-based mask generation unit 418, and the output image processing unit 420) of the video processing system 400 is implemented as software, hardware (e.g., circuitry and/or a processor), or a combination thereof. Although the units are illustrated with separate boxes, it should be understood that in various implementations, any or all of the units can be integrated into a single entity (such as a hardware circuit, processor, software, or combination thereof).

Although it is stated that the video processing system 400 can operate in either the fixed-depth mode or the tracking mode, in an alternative implementation, the video processing system 400 is capable of operating in the tracking mode but not in the fixed-depth mode.

Figure 5:
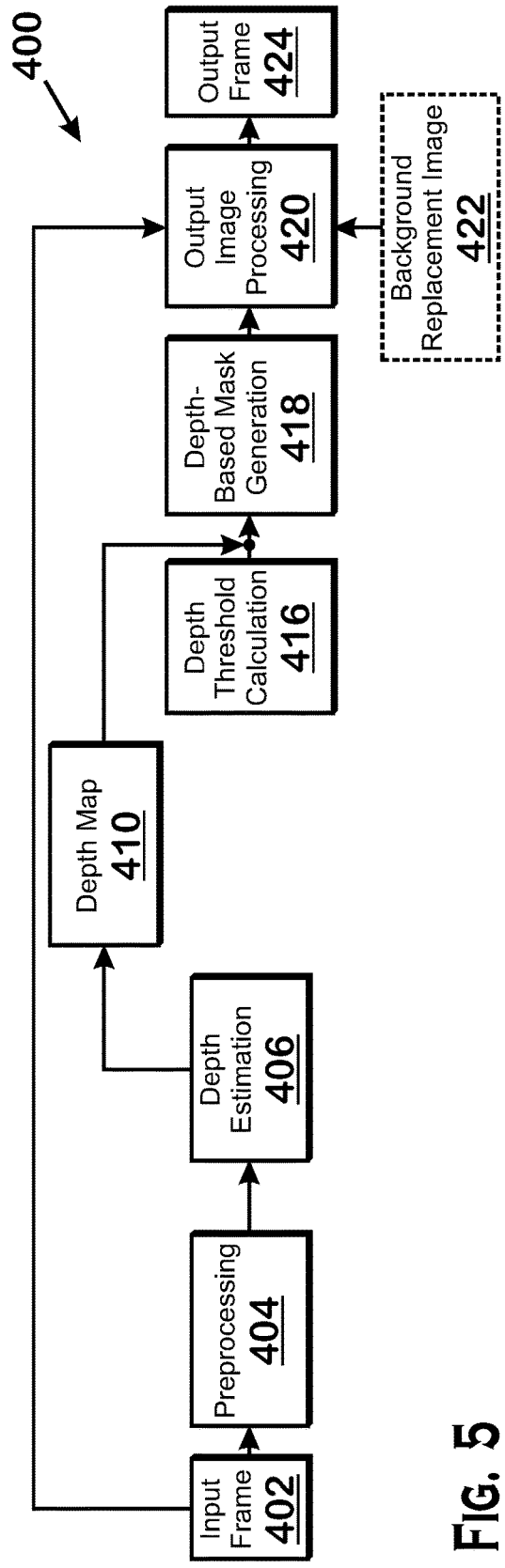
FIG. 5 illustrates a video processing system capable of operating in the fixed-depth mode but not in the tracking mode, according to an example.

FIG. 5 illustrates a video processing system 500 capable of operating in the fixed-depth mode but not in the tracking mode, according to an example. The video processing system 500 includes a pre-processing unit 404, a depth estimation unit 406, a depth threshold calculation unit 416, a depth-based mask generation unit 418, and an output image process unit 420.

The video processing system 500 performs the operations associated with the fixed-depth mode, described elsewhere herein. Specifically, the pre-processing unit 404 converts the data of the input frame 402 for use by the depth estimation unit 406. The depth estimation unit 406 generates the depth map 410 for the input frame 402. The depth threshold calculation unit 416 generates the depth threshold as described above (for example, obtains a constant depth threshold value) from an application. The depth-based mask generation 418 generates the mask indicating which portions of the input frame 402 pass the threshold. The output image processing unit 420 blurs or replaces the portions of the image per the depth-based mask, to generate the output frame 424.

Figure 6A:
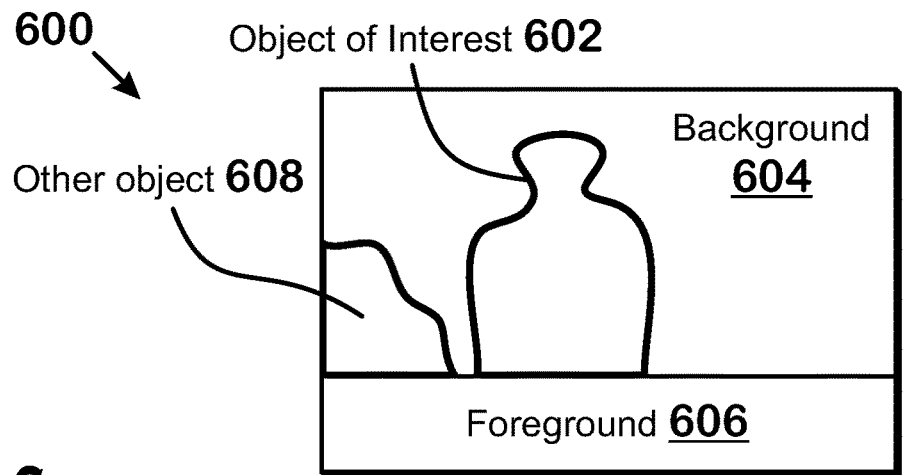
FIGS. 6A-6C illustrate example images processed by a video processing system, according to an example.
Figure 6B:
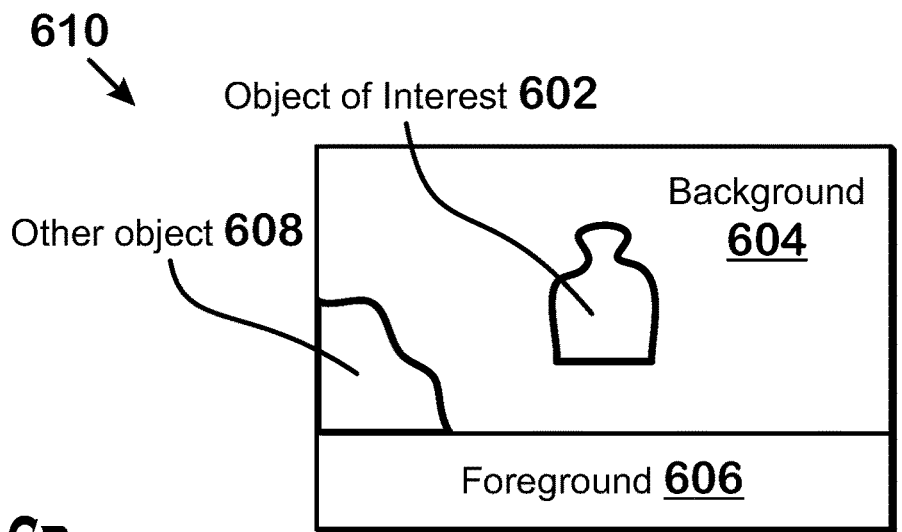
Figure 6C:
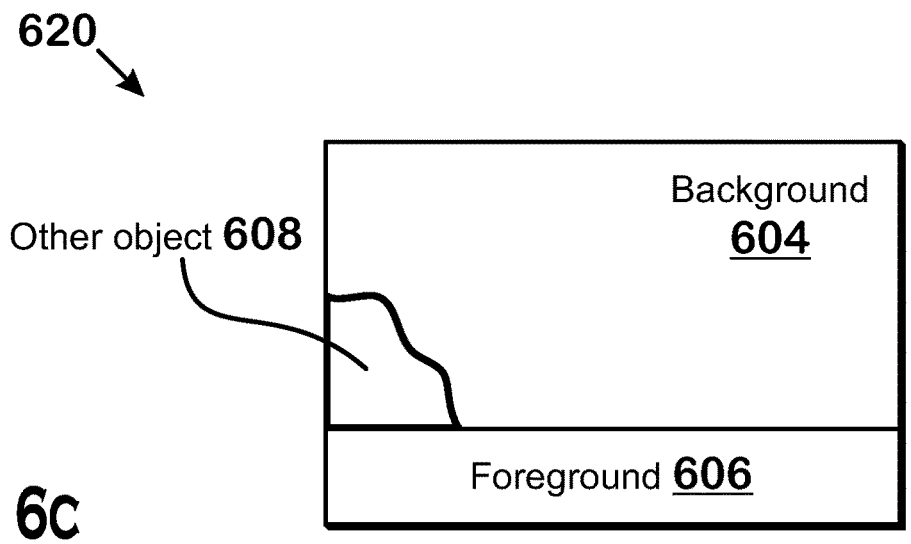

FIGS. 6A-6C illustrate example images processed by a video processing system (e.g., system 400 or system 500), according to an example. FIG. 6A illustrates an image 600 including an object of interest 602, a background 604, a foreground 606, and an other object 608.

In the tracking mode, the system 400 identifies the object of interest 602 through instance segmentation, and identifies a depth threshold for the object of interest 602, based on the depths of the pixels of the object of interest. The system 400 also identifies depths of the other portions of the image 600, such as the background 604, the other object 608, and the foreground 606. Based on a threshold that is derived from the depths associated with the object of interest 602, the system 400 selects one or more portions of the image 600 to modify (e.g., blur or replace), and modifies those portions of the image. In an example, the system 400 modifies portions closer than the object of interest 602, but not portions farther than the object of interest 602. In such an example, the system 400 would modify objects in the foreground 606. In an example, the system modifies portions farther than the object of interest 602, but not portions closer than the object of interest 602. In such an example, the system 400 would modify objects in the background 604. In some examples, the system 400 uses two thresholds, modifying both portions closer than the object of interest 602 and portions farther than the object of interest 602. In such an example, the system 400 modifies the background 604 and the foreground 606. In the event that the other object 608 has a similar depth to the object of interest 602, the system 400 does not modify the other object 608, even though the other object 608 is not a part of the object of interest 602. In the fixed-depth mode, the system 400 identifies determines which items of the image 600 are in front of or behind a fixed depth threshold. The system 400 blurs or replaces that portion of the image 600.

FIG. 6B illustrates an example image 610 in which the object of interest 602 is farther from the camera than the object of interest 602 in FIG. 6A, and the system is operating in the tracking mode. In this mode, the system 400 determines the depth threshold based on the depth of the object of interest 602, which is different than the depth of the object of interest 602 in FIG. 6A. Based on this depth, the system 400 modifies portions of the image in front of or behind this depth. Because the object of interest 602 has changed depth, the portions of the foreground 606 or background 604 that are modified may change. In an example, where portions of the image 610 having a greater depth of the object of interest 602 are modified, when the object of interest 602 moves farther from the camera, a greater portion of the image 610 is not modified.

FIG. 6C illustrates an example image 620 in which the object of interest 602 has moved farther from the camera and the system 400 is operating in a fixed-depth mode. In this mode, the object of interest 602 has moved farther away from the camera than the fixed depth threshold. Therefore, the object of interest 602 has been modified.

Figure 7:
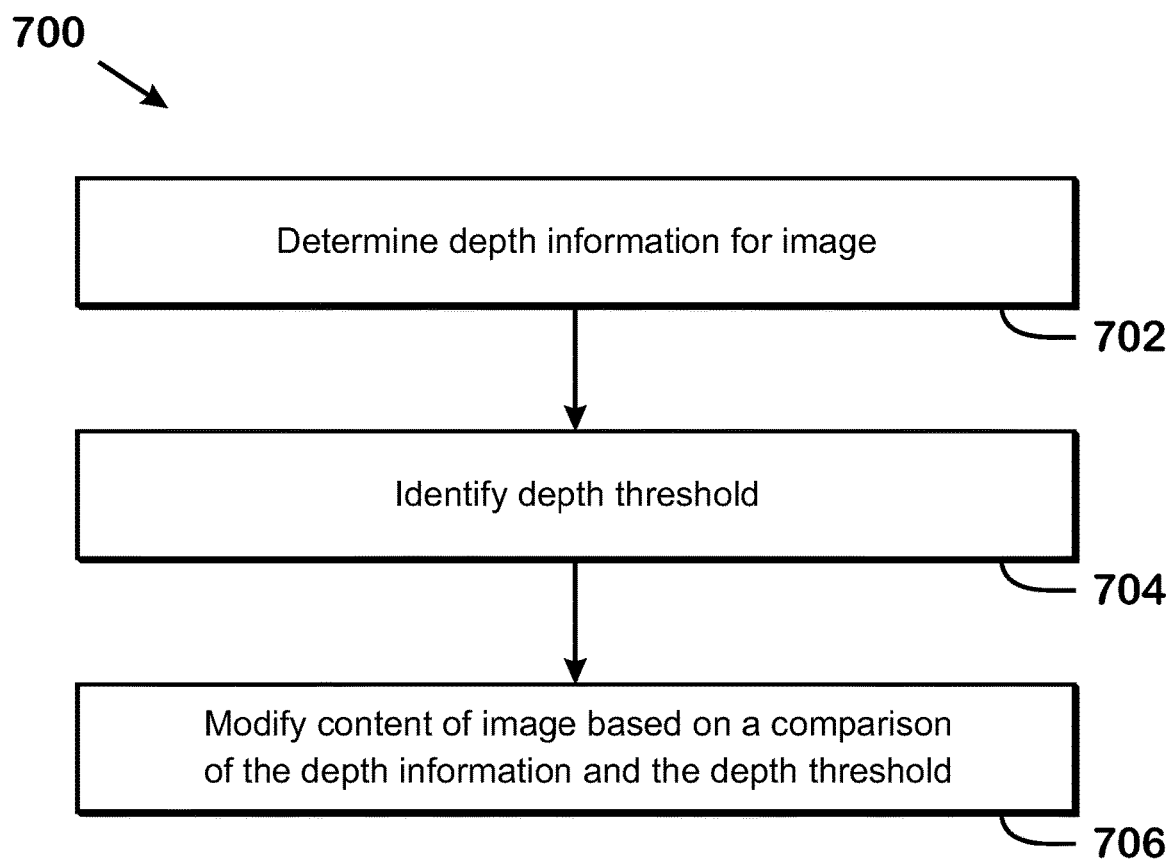
FIG. 7 is a flow diagram of a method for processing images, according to an example.

FIG. 7 is a flow diagram of a method 700 for processing images, according to an example. Although described with respect to the system of FIGS. 1-6C, those of skill in the art should understand that any system configured to perform the steps of the method 700 in any technically feasible order falls within the scope of the present disclosure.

At step 702, the system 400 determines depth information for an image. In some examples, determining the depth information includes generating a depth map for the image, where the depth map indicates depths of different portions (e.g., pixels) of the image.

At step 704, the system 400 identifies a depth threshold. In a fixed-depth mode, the threshold is provided as a value from, for example, an application. In some examples, the application obtains this information from the user. In a tracking mode, the system 400 identifies the depth threshold from an identified object of interest. For example, the system 400 identifies the farthest depth, the closest depth, an average depth, or any other depth value based on the depths of the object of interest. At step 706, the system 400 modifies the image based on a comparison of the depth information of the image and the depth threshold. In some examples, the system modifies all portions of the image farther from the camera than the threshold, closer to the camera than the threshold, or based on some other technically feasible comparison. In some examples, a far and near threshold are used to modify anything closer than the near threshold and anything farther than the far threshold.

In some examples, generating the depth information also includes performing instance segmentation to identify one or more objects of interest and combining this identification with the depth map to obtain It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for image manipulation, the method comprising:
   determining depth information for an image, the depth information including depth information for an object of interest;
   identifying a first depth threshold and a second depth threshold based on the depth information for the object of interest, the first depth threshold being closer to a camera than the object of interest and the second depth threshold being farther from the camera than the object of interest; and
   modifying content of the image based on the first depth threshold and the second depth threshold, the modifying including obscuring a portion of the image closer than the first depth threshold and farther than the second depth threshold.

2. The method of claim 1, wherein modifying the content further includes blurring the content or replacing the content with a replacement image.

3. The method of claim 1, wherein modifying the content further includes modifying content that is farther than the depth threshold or modifying content that is closer than the depth threshold.

4. The method of claim 1, wherein determining the depth information includes generating a depth map that indicates depth information for different portions of the image.

5. The method of claim 1, wherein determining the depth information includes applying the image to a neural network and receiving the depth information in response.

6. The method of claim 1, wherein identifying the depth threshold includes obtaining a depth threshold from an application.

7. The method of claim 1, further comprising:
   performing the determining, identifying, and modifying for multiple frames of a video.

8. The method of claim 7, further comprising:
   tracking depth of an object of interest through multiple frames of the video and modifying the content of the multiple frames based on the varying depth of the object of image.

9. A system for image manipulation, the system comprising:
   a memory storing an image; and
   a processor configured to:
      determine depth information for the image, the depth information including depth information for an object of interest;
      identify a first depth threshold and a second depth threshold based on the depth information for the object of interest, the first depth threshold being closer to a camera than the object of interest and the second depth threshold being farther from the camera than the object of interest; and
      modify content of the image based on the first depth threshold and the second depth threshold, the obscuring including modifying a portion of the image closer than the first threshold and farther than the second threshold.

10. The system of claim 9, wherein modifying the content further includes blurring the content or replacing the content with a replacement image.

11. The system of claim 9, wherein modifying the content further includes modifying content that is farther than the depth threshold or modifying content that is closer than the depth threshold.

12. The system of claim 9, wherein determining the depth information includes generating a depth map that indicates depth information for different portions of the image.

13. The system of claim 9, wherein determining the depth information includes applying the image to a neural network and receiving the depth information in response.

14. The system of claim 9, wherein identifying the depth threshold includes obtaining a depth threshold from an application.

15. The system of claim 1, wherein the processor is further configured to:
   perform the determining, identifying, and modifying for multiple frames of a video.

16. The system of claim 15, wherein the processor is further configured to:
   track depth of an object of interest through multiple frames of the video and modify the content of the multiple frames based on the varying depth of the object of image.

17. A non-transitory computer-readable medium storing instructions that cause a processor to perform operations including:
   determining depth information for an image, the depth information including depth information for an object of interest;
   identifying a first depth threshold and a second depth threshold based on the depth information for the object of interest, the first depth threshold being closer to a camera than the object of interest and the second depth threshold being farther from the camera than the object of interest; and
   modifying content of the image based on the first depth threshold and the second depth threshold, the modifying including obscuring a portion of the image closer than the first threshold and farther than the second threshold.

18. The non-transitory computer-readable medium of claim 17, wherein modifying the content further includes blurring the content or replacing the content with a replacement image.

19. The non-transitory computer-readable medium of claim 17, wherein modifying the content further includes modifying content that is farther than the depth threshold or modifying content that is closer than the depth threshold.

20. The non-transitory computer-readable medium of claim 17, wherein determining the depth information includes generating a depth map that indicates depth information for different portions of the image.

* * * * *